(12) United States Patent
Watanabe (10) Patent No.: US 8,483,339 B2
(45) Date of Patent: Jul. 9, 2013

(54) COMMUNICATION APPARATUS AND COMMUNICATION PROCESS METHOD

(75) Inventor: Masao Watanabe, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 289 days.

(21) Appl. No.: 12/952,894

(22) Filed: Nov. 23, 2010

(65) Prior Publication Data

US 2011/0134987 A1    Jun. 9, 2011

(30) Foreign Application Priority Data

Dec. 8, 2009 (JP) ................. 2009-278168

(51) Int. Cl.
*H04L 1/06* (2006.01)
(52) U.S. Cl.
USPC ........... 375/347; 375/349; 375/324; 375/299; 375/260; 375/267
(58) Field of Classification Search
USPC .................. 375/347, 349, 324, 299, 260, 267
See application file for complete search history.

(56) References Cited

U.S. PATENT DOCUMENTS

| | | | |
|---|---|---|---|
| 6,118,773 A * | 9/2000 | Todd | 370/334 |
| 2007/0230604 A1* | 10/2007 | Nakamura | 375/260 |

FOREIGN PATENT DOCUMENTS

JP    2007-43650 A    2/2007

\* cited by examiner

*Primary Examiner* — Kabir A Timory
(74) *Attorney, Agent, or Firm* — Foley & Lardner LLP (57) ABSTRACT

Provided is a communication apparatus and a communication process method that improve reception quality when receiving a signal using a plurality of antennas. The communication apparatus includes an RF tuner that receives a wireless signal by the plurality of antennas, a noise amount detection unit that measures the amount of noise of each antenna according to the wireless signal received by the RF tuner, and a time-division timing generation unit that switches a selection of the plurality of antennas by time-division. The time-division timing generation unit periodically switches the plurality of antennas. Further, the time-division timing generation unit makes a selection so that the antenna with the best reception quality has a relatively longer selected period than the other antennas.

8 Claims, 9 Drawing Sheets

COMMUNICATION APPARATUS AND COMMUNICATION PROCESS METHOD

INCORPORATION BY REFERENCE

This application is based upon and claims the benefit of priority from Japanese patent application No. 2009-278168, filed on Dec. 8, 2009, the disclosure of which is incorporated herein in its entirety by reference.

BACKGROUND

1. Field of the Invention

The present invention relates to a communication apparatus and a communication process method. In particular, the present invention relates to a communication apparatus and a communication process method that control a plurality of antennas.

2. Description of Related Art

When communicating by a portable television reception apparatus, an antenna mounted to the portable television reception apparatus is used to receive wireless signals. In such a case, a user using the portable television reception apparatus often communicates while moving. In general, the antenna mounted to the portable television reception apparatus is usually a simple antenna. Therefore, the antenna mounted to the portable television reception apparatus has low tolerance to a change in the receive sensitivity. Thus, small fluctuation of the reception position may unable the reception. In order to solve such a problem, there is a method of mounting a plurality of antennas to the portable television reception apparatus and performing diversity reception. The diversity reception is that each of the antennas receives the same wireless signal and by synthesizing the received signal, the reception quality is improved.

However, in order to perform the diversity reception, it is necessary to prepare a tuner for each antenna, and the tuner has to process the wireless signal received by respective antenna. In general, the ratio of the electric power consumed by the tuner to the electric power consumed by a receiver for receiving the wireless signals is high. Therefore, if there are tuners provided for each of the antennas, a problem occurs in which the power consumption of the apparatus increases.

Thus, Japanese Unexamined Patent Application Publication No. 2007-43650 discloses a configuration to share one tuner by two antennas. The two antennas are alternatively switched, and if the reception quality of one antenna during communication is reduced, the tuner is switched to the other antenna to receive the wireless signals

SUMMARY

The present inventor has found a problem which is explained hereinafter, in the case of switching the antennas using the method disclosed in Japanese Unexamined Patent Application Publication No. 2007-43650 with reference to FIG. 9.

Figure 9:
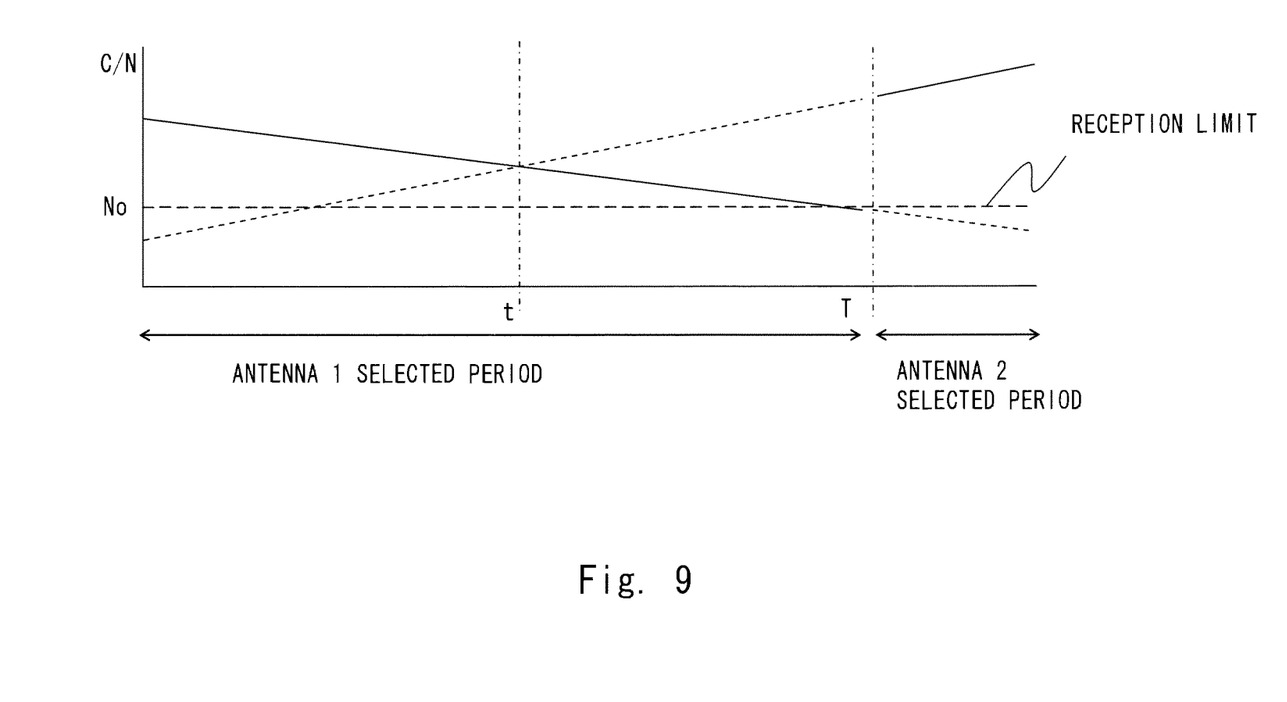
FIG. 9 illustrates timings of antenna switching according to a related art.

In the graph of FIG. 9, the vertical axis represents the C/N ratio (Carrier to Noise ratio) measured by the antenna. The horizontal axis represents time. The solid line represents the C/N ratio of the antenna actually selected, and the dashed line represents the C/N ratio of the antenna not selected. The C/N ratio indicating the reception limit of the antenna shall be $N_0$. $N_0$ changes by disturbance conditions, such as fading and multi-path, and does not indicate a fixed value. An antenna 1 is switched to an antenna 2 at the time T when the C/N ratio of the antenna 1 reaches $N_0$, which is assumed to be the reception limit. By switching the antennas at the timing which is assumed to be the reception limit, it is possible to maintain a normal reception state if a characteristic of the antenna 2 is in the receivable state. However, the reception state of the antenna 2 cannot be known in advance at the timing to switch the antennas. Therefore, there is a possibility that the reception characteristic deteriorates by switching the antennas. The relationship between the C/N ratio and the reception limit of the antenna depends on environmental factors, such as fading and multipath. Therefore, even in the state in which the antenna 1 can keep receiving signals, it is evaluated as the reception limit and the antenna 1 is switched to the antenna 2. Accordingly, there is a possibility of generating larger deterioration even if the switching time is short. At the time of performing more accurate evaluation using an error ratio instead of evaluation using the C/N ratio that changes according to the environment, there is a possibility that a characteristic deterioration occurs because the antenna switching timing delays due to delay caused by the time interleave and error correction.

A first exemplary aspect of the present invention is a communication apparatus that includes a signal reception unit that receives a wireless signal by a plurality of antennas, a measurement unit that measures reception quality of each of the antennas according to the wireless signal received by the signal reception unit, and an antenna selection control unit that switches a selection of the plurality of antennas by time-division. The antenna selection control unit periodically switches the plurality of antennas and also specifies the antenna with the best reception quality to have a relatively longer selected period than the other antennas according to the reception quality measured by the measurement unit. A second exemplary aspect of the present invention is a communication process method that includes periodically switching a plurality of antennas by time-division and obtaining reception quality of a received signal for each of the antennas, in which the received signal is received by the plurality of antennas and determining a selected period of the antenna so that the antenna with the best reception quality will have a relatively longer selected period than the other antennas according to the reception quality obtained for each of the antennas.

As described so far, by periodically switching the antennas and measuring the reception quality of each antenna, it is possible to recognize the reception quality of other antennas than the communicating antenna, and select the antenna with better reception quality to communicate.

The present invention provides a communication apparatus and a communication method that improve reception quality at the time of receiving signals using a plurality of antennas.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

The first and second exemplary embodiments can be combined as desirable by one of ordinary skill in the art.

First Exemplary Embodiment

Figure 1:
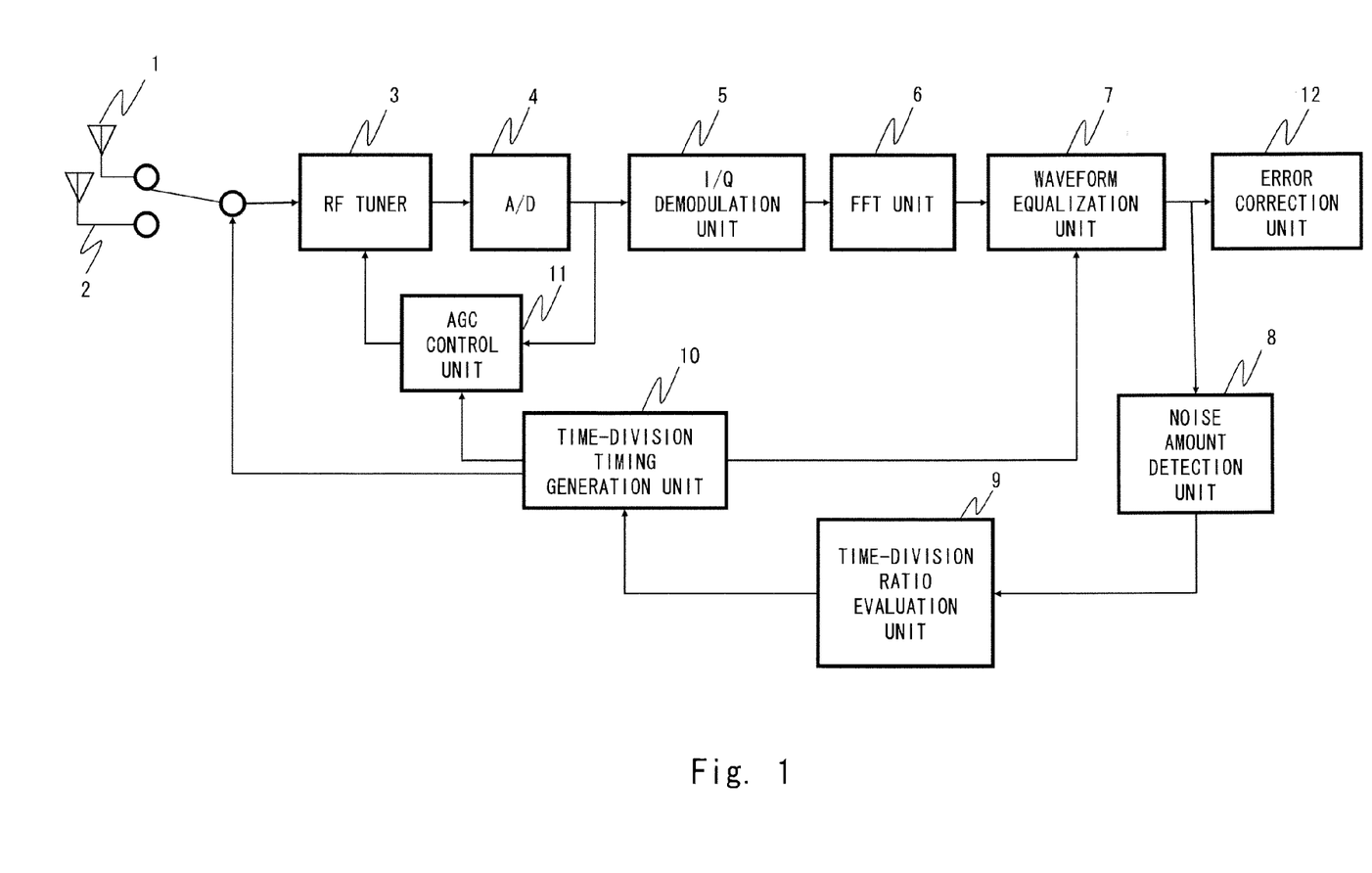
FIG. 1 is a block diagram of a communication apparatus according to a first exemplary embodiment.

Hereinafter, exemplary embodiments of the present invention are described with reference to the drawings. FIG. 1 illustrates a configuration example of a communication apparatus according to the first exemplary embodiment of the present invention.

A communication apparatus includes an antenna 1, an antenna 2, an RF tuner 3, and an A/D (Analog/Digital) conversion unit 4, an I/Q demodulation unit 5, a Fast Fourier Transform unit (hereinafter referred to as a FFT unit) 6, a waveform equalization unit 7, a noise amount detection unit 8, a time-division ratio evaluation unit 9, a time-division timing generation unit 10, an AGC (Automatic Gain Control) control unit 11, and an error correction unit 12, the signal reception unit corresponds to the antenna 1, the antenna 2, and the RF tuner 3. The measurement unit corresponds to the noise amount detection unit 8. the antenna selection control unit corresponds to the time-division timing generation unit 10. the signal level control unit corresponds to the AGC control unit 11.

Further, the signal reception unit shall include a means to receive signals, the measurement unit shall include a means to measure the amount of noise, the antenna selection control unit shall include a means to perform antenna control, and the signal level control unit shall include a means to control a signal level.

The antennas 1 and 2 are alternatively switched. The switching timing of the antennas 1 and 2 is explained later in detail. The antennas 1 and 2 receive an RF (Radio Frequency) signal from a correspondent. If the communication apparatus is a portable television reception apparatus, the antennas receive the RF signal transmitted from a broadcasting station. The antennas 1 and 2 output the received RF signal to the RF tuner 3.

The RF tuner 3 converts the RF signal received from the antennas 1 and 2 into a baseband or an IF (Intermediate Frequency) signal, and then outputs the converted signal to the A/D conversion unit 4.

The A/D conversion unit 4 converts the IF signal received from the RF tuner 3 into a digital signal, and outputs the converted signal to the I/Q demodulation unit 5. If the RF tuner 3 received the baseband signal, I/Q demodulation will not be performed, thus the process of the I/Q demodulation unit 5 is unnecessary. The AGC control unit 11 receives the level of the digital signal, which is output to the I/Q demodulation unit 5 from the A/D conversion unit 4, and performs control to match the target level. That is, the AGC control unit 11 performs control to increase and decrease the level of the digital signal to match the target level. Further, the AGC control unit 11 performs control using the digital signal output from the A/D conversion unit 4, however the control may be performed using the digital signal after the process of the A/D conversion unit 4.

The I/Q demodulation unit 5 converts the IF signal received from the A/D conversion unit 4 into baseband I and Q signals. The I/Q demodulation unit 5 outputs the converted I signal and Q signals to the FFT unit 6.

The FFT unit 6 performs Fourier transform to the signal in the time domain obtained from the I/Q demodulation unit 5 into a signal of the frequency domain. The Fourier transformed signal is output to the waveform equalization unit 7.

The waveform equalization unit 7 performs a waveform equalization process using a pilot signal. More specifically, the waveform equalization process transmitted using QPSK modulation is explained. The QPSK modulated digital signal is demodulated by the I/Q demodulation unit 5 so that, ideally, the I and Q signals have values near each signal $(1, 1), (1, -1), (-1, 1),$ and $(-1, -1)$. However, due to the influence of frequency selective fading, the phase and amplitude change, and the modulated signal is demodulated as a digital signal that has signals with different positions from ideal I and Q signals. The waveform equalization process is to perform a transform process on the digital signal that has signals with different positions from the ideal I and Q signals to be closer to the position of the ideal I and Q signals using the pilot signal as an equalization standard.

Figure 2:
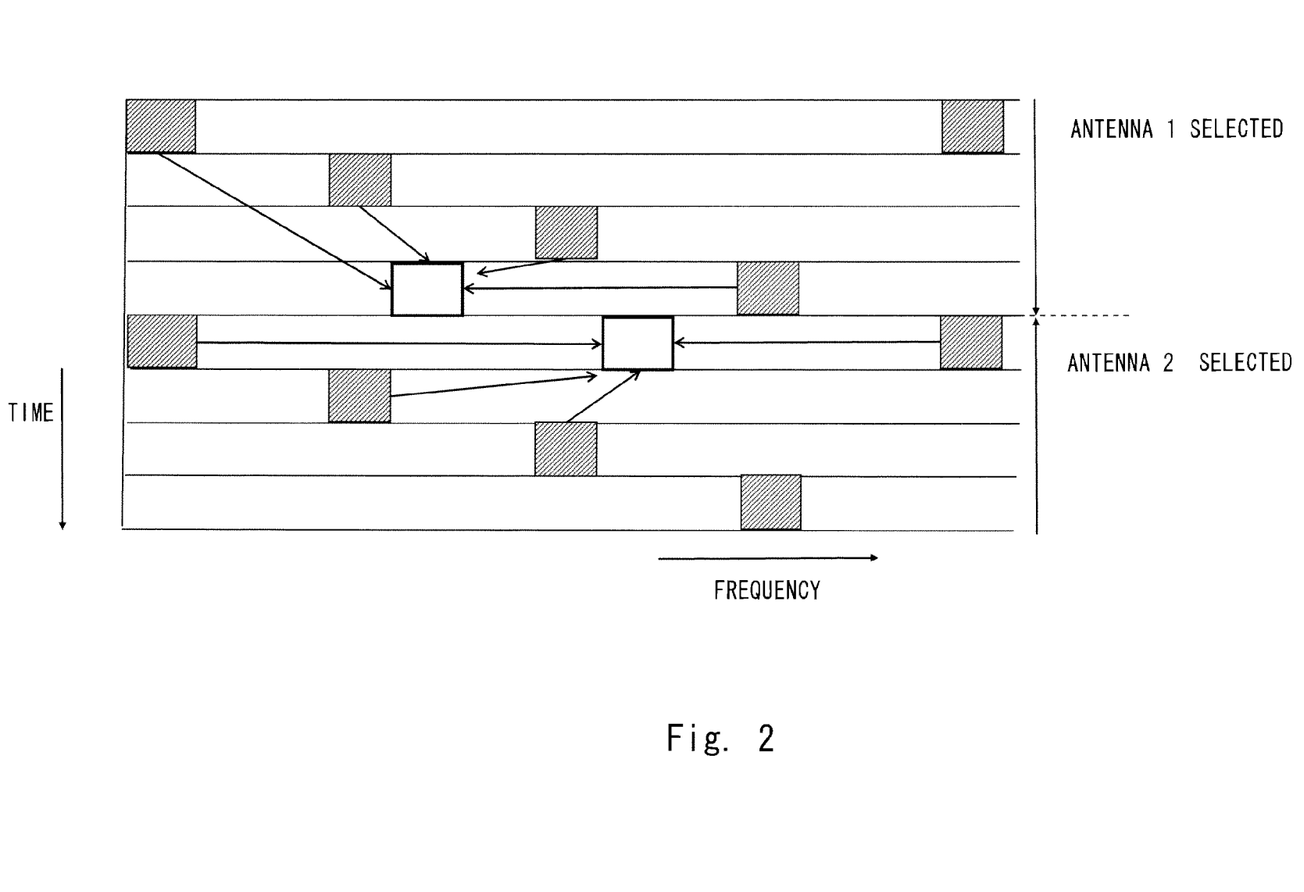
FIG. 2 is a schematic diagram of a waveform equalization process according to the first exemplary embodiment.

Further, the pilot signal used for the equalization process performs the waveform equalization process using only the pilot signal received using the same antenna. The outline of the waveform equalization process using the pilot signal is explained with reference to FIG. 2. The vertical axis represents the time direction and the horizontal axis represents the frequency direction. In FIG. 2, the data until the fourth symbol in the time axis direction is the data received while selecting the antenna 1. The data after the fourth symbol is the data received at the time of selecting the antenna 2. The shaded data is the pilot signal, and the data indicated by the white square is a signal to be equalized.

As shown in FIG. 2, the signal to be equalized received by the antenna 1 performs the waveform equalization using the pilot signal received by the antenna 1. The signal to be equalized received by the antenna 2 performs the waveform equalization using the pilot signal received by the antenna 2. This is to reduce the deterioration of the reception characteristic by performing the waveform equalization using only the pilot signal which is received by the respective antennas as there are deviations in the phase and amplitude between the symbols received by each antenna 1 and 2. The waveform equalization unit 7 outputs the digital signal, which has been processed with the waveform equalization, to the noise amount detection unit 8 and the error correction unit 12.

The noise amount detection unit 8 detects the amount of noise of the digital signal received from the waveform equalization unit 7. The amount of noise is detected by measuring the deviation in the I and Q signals of the digital signal, which is processed with the waveform equalization process, from the ideal I and Q signals. The waveform equalization unit 7 performs the waveform equalization so that the I and Q signals of the digital signal received from the FFT unit 6 will be close to the position of the ideal I and Q signals. However there is a deviation generated in the position of the I and Q signals of the digital signal, which is performed with the waveform equalization process, from the ideal I and Q signals. This is caused by noise. Accordingly, the amount of noise can be detected using the values of the I and Q signals of the digital signal which is performed with the waveform equalization process. The noise amount detection unit 8 detects the amount of noise of the digital signal according to the signal received by each of the antennas 1 and 2. The amount of noise detected by the noise amount detection unit 8 is output to the time-division ratio evaluation unit 9.

Next, the time-division ratio evaluation unit 9 determines the selection ratio of the antennas 1 and 2 according to the amount of noise obtained from the noise amount detection unit 8. The selection ratio of the antennas 1 and 2 is determined so that the selected period of the antenna with less amount of noise of the digital signal is longer than the selected period of the other antenna. At this time, long and short periods may be defined in advance as the selected periods of the antennas, and the long selected period may be specified to the antenna with less amount of noise and the short selected period may be specified to the antenna with more amount of noise. The outline of an antenna switching is explained with reference to FIGS. 3A and 3B.

Figure 3A:
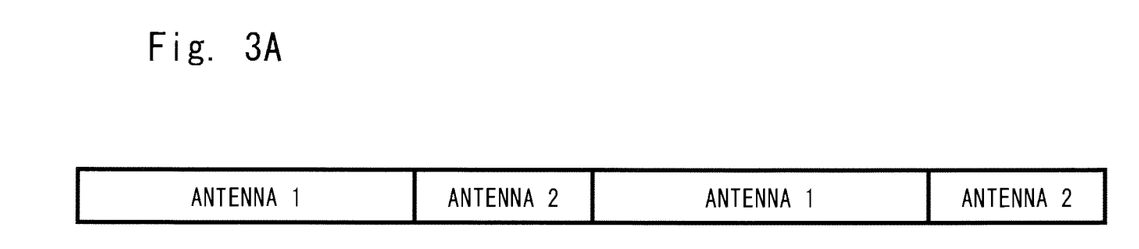
FIGS. 3A and 3B are schematic diagrams of an antenna switching process according to the first exemplary embodiment.
Figure 3B:
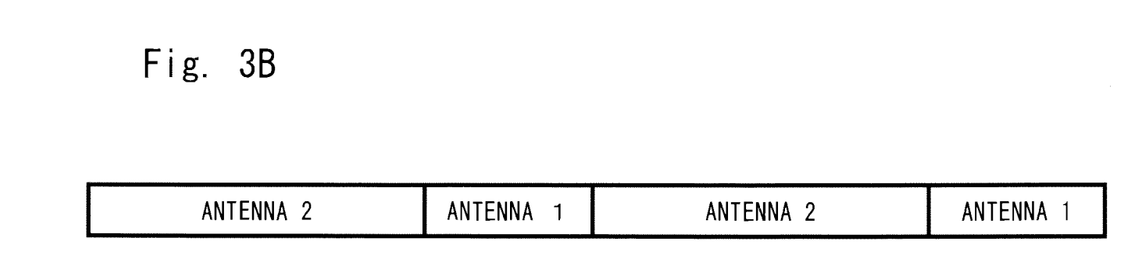

FIG. 3A illustrates the selected periods of the antennas 1 and 2 when there is a small amount of noise of the antenna 1. Suppose that the horizontal axis is time, and then the selected period of the antenna 1 is relatively longer than that of the antenna 2. FIG. 3B illustrates the selected period of the antennas 1 and 2 when there is a small amount of noises of the antenna 2. In this case, the selected period of the antenna 2 is relatively longer than that of the antenna 1. Moreover, in order to enable the time interleave, it is required to suppress the relatively short selected period of the antenna to about four symbol time.

The time-division timing generation unit 10 notifies the antennas 1 and 2 of the actual switching timing between the antennas 1 and 2 based on the selected period of the antennas 1 and 2 which is received from the time-division ratio evaluation unit 9. It is desirable to switch the antennas 1 and 2 at the first timing and not in the middle of the symbols. For example, as for an OFDM signal, it is desirable to switch the antennas 1 and 2 at the timing to receive the first timing of a symbol that includes guard interval and data parts. This is because that if the antennas 1 and 2 are switched while receiving one symbol, when performing an FFT process to data with different phase and amplitude or the like which is obtained from a different antenna in the same symbol, a large deterioration is generated in the operation result.

For example, in the case of the OFDM signal in which one symbol is 1 ms, the time-division timing generation unit 10 generates the timing to switch the antennas 1 and 2 with one millisecond as the minimum unit. The time-division timing generation unit 10 outputs the generated antenna switching timing information to the antennas 1 and 2, the AGC control unit 11, and the waveform equalization unit 7.

The antennas 1 and 2, which obtained the antenna switching timing information from the time-division timing generation unit 10, are switched by time-division based on the obtained timing information.

In response to the antenna switching timing information obtained from the time-division timing generation unit 10, the AGC control unit 11 can change the value of the gain to signals obtained from the tuner at the switching timing of the antennas 1 and 2. The outline of the AGC control is explained with reference to FIG. 4.

Figure 4:
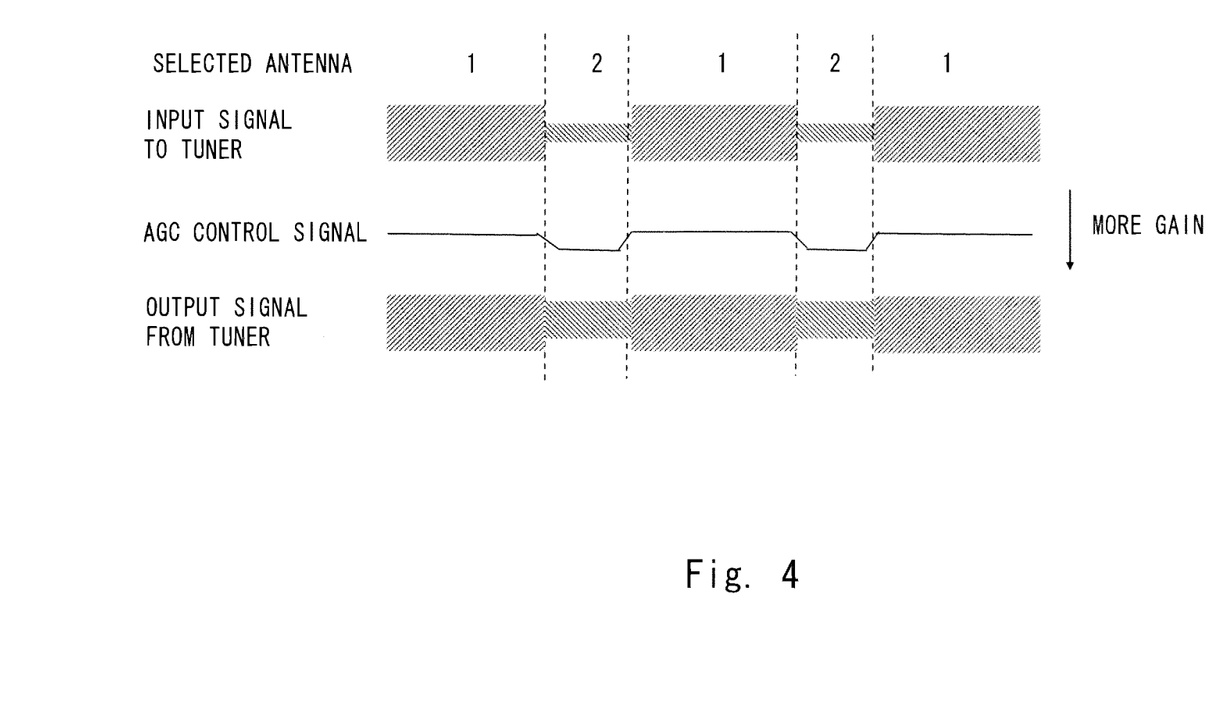
FIG. 4 is a schematic diagram of AGC control according to the first exemplary embodiment.

As shown in FIG. 4, in the antennas 1 and 2 with different received electric fields, the control is performed in which the received electric field reduces the gain and the received electric field of the antenna 2 reduces the gain, so that the input level to the demodulator becomes constant. Accordingly, this reduces the influence of overflow of the ADC at the time of excessive level input, and deterioration of the quantization noise characteristics at the time of small level input.

Further, the AGC control unit 11 holds the AGC control level, which is suitable to the antenna, immediately before the antennas are switched. Then, by restoring the control level at once when the same antenna is selected again after switching to the other antenna, it is possible to perform the AGC control that is appropriate for each of the antennas at any time.

As for the OFDM signal, characteristic deterioration may occur by rapid fluctuation of the level in one symbol. In order to avoid such a situation, the time constant of AGC is usually specified to the length from several to a few tens of symbols or more. Therefore, even if the antenna is switched to the antenna with a low level for a short time, large fluctuation of the AGC control level will not occur. Thus the same AGC control may continue whether or not the antennas are switched.

In response to the notification of the switching time of the antennas 1 and 2 by the time-division timing generation unit 10, the waveform equalization unit 7 selects the pilot signal received from the antenna, which is the same antenna that received the signal to be equalized, as the pilot signal to be used for the waveform equalization process of the signal to be equalized. As described above, this is because that there is a deviation generated in the phase and amplitude in the pilot signals obtained from different antennas, thus the pilot signal obtained from the same antenna as the one obtained the signal to be equalized must be used for the waveform equalization process.

Figure 5A:
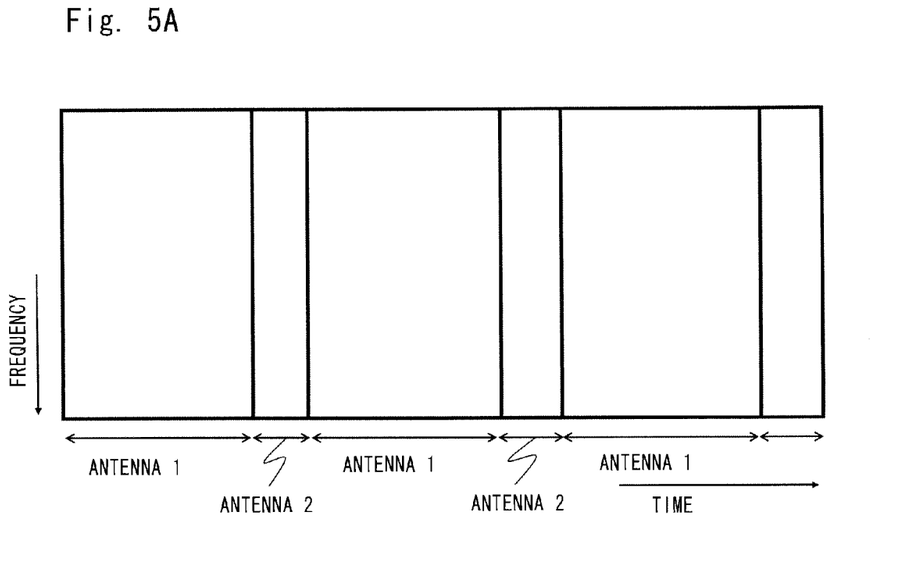
FIGS. 5A and 5B are schematic diagrams of an interleave process according to the first exemplary embodiment.
Figure 5B:
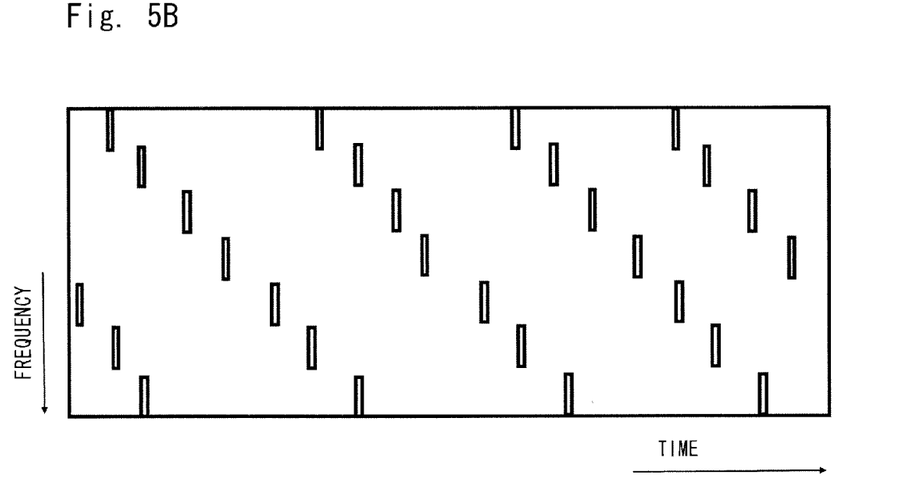

The error correction unit 12 performs the time interleave. The time interleave process in the error correction unit 12 is explained with reference to FIGS. 5A and 5B. In FIG. 5A, as the reception quality of the antenna 2 is worse than that of the antenna 1, the selected period of the antenna 2 is specified to be relatively short. In this case, there is a high possibility that more errors are included in the data received in the selected period of the antenna 2 than the received data of the antenna 1. Therefore, as shown in FIG. 5B, by performing the interleave process in the time direction, the data received in the selected period of the antenna 2 can be diffused. That is, by diffusing the data received in the selected period of the antenna 2, which has a high possibility of having errors, in the bit sequence, it is possible to effectively perform error correction.

By performing the time interleave process in this way, even if a certain selected period is allocated to the antenna with inferior reception quality to check its reception quality, the reduction in the reception quality for the entire data received by the communication apparatus is small. Therefore, there is a small influence on the reception quality from switching antennas 1 and 2 by time-division.

Figure 6:
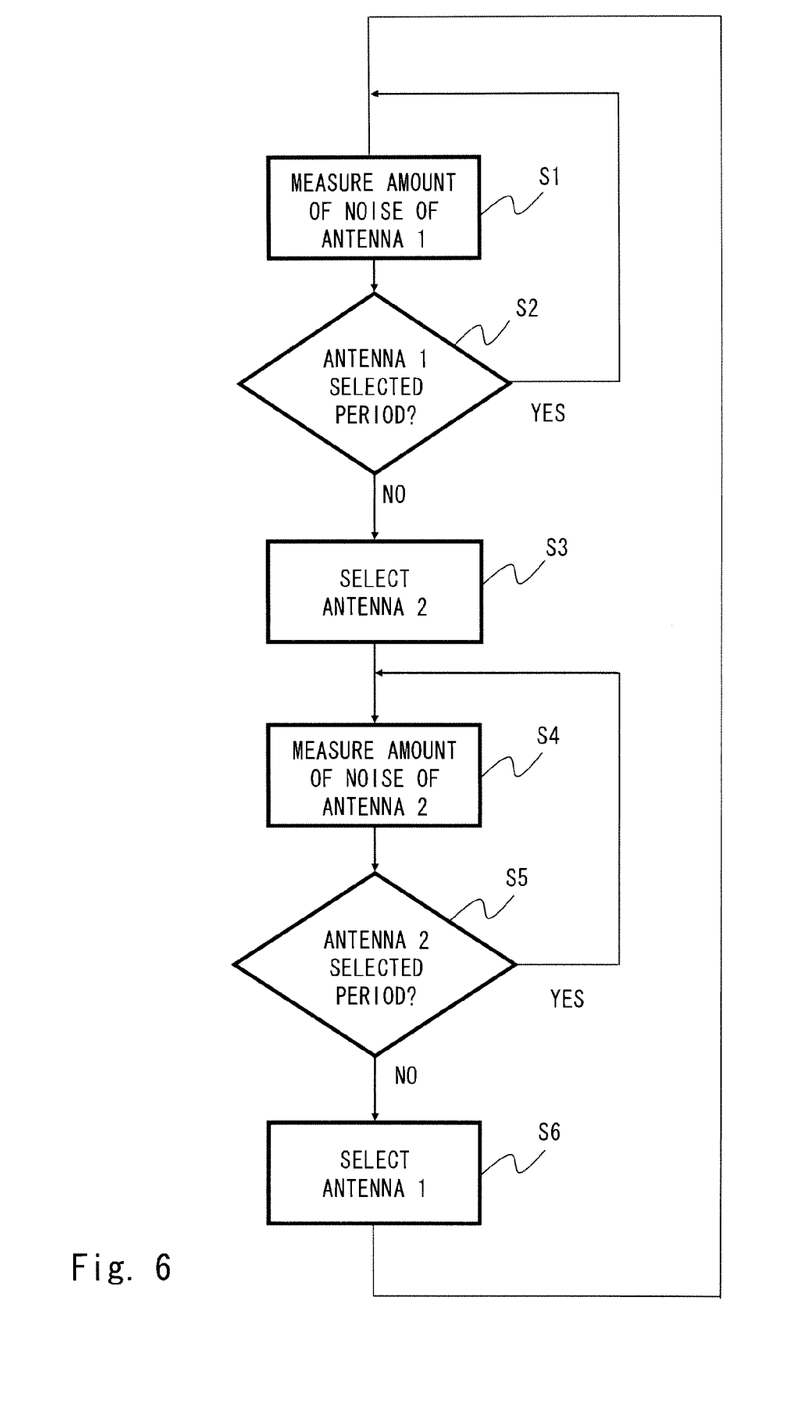
FIG. 6 is a flowchart of a noise amount measurement process according to the first exemplary embodiment.

Next, the process flow of noise amount measurement according to the first exemplary embodiment of the present invention is described with reference to FIG. 6. In FIG. 6, the process flow is explained from the status that antenna 1 is selected.

First, the noise amount detection unit 8 measures the amount of noise of the digital signal obtained from the waveform equalization unit 7 (S1). The measured amount of noise is output to the time-division ratio evaluation unit 9.

Next, the noise amount detection unit 8 evaluates whether it is in the selected period of the antenna 1 (S2). The information of the selected period of the antenna 1 is obtained from the waveform equalization unit 7. If it is in the selected period of the antenna 1, the noise amount detection unit 8 returns to the process of the step S1, and the noise amount detection unit 8 measures the amount of noise. If it is not in the selected period of the antenna 1, the noise amount detection unit 8 selects the antenna 2 as the antenna to detect the amount of noise (S3).

Next, the noise amount detection unit 8 measures the amount of noise of the antenna 2 in a similar manner as the antenna 1 (S4). The measured amount of noise is output to the time-division ratio evaluation unit 9.

Next, the noise amount detection unit 8 evaluates whether it is in the selected period of the antenna 2 (S5). If it is in the selected period of the antenna 2, the noise amount detection unit 8 returns to the process of step S4 and measures the amount of noise of the antenna 2. If it is not the selected period of the antenna 2, the noise amount detection unit 8 selects the antenna 1 as the antenna to detect the amount of noise (S6).

Figure 7:
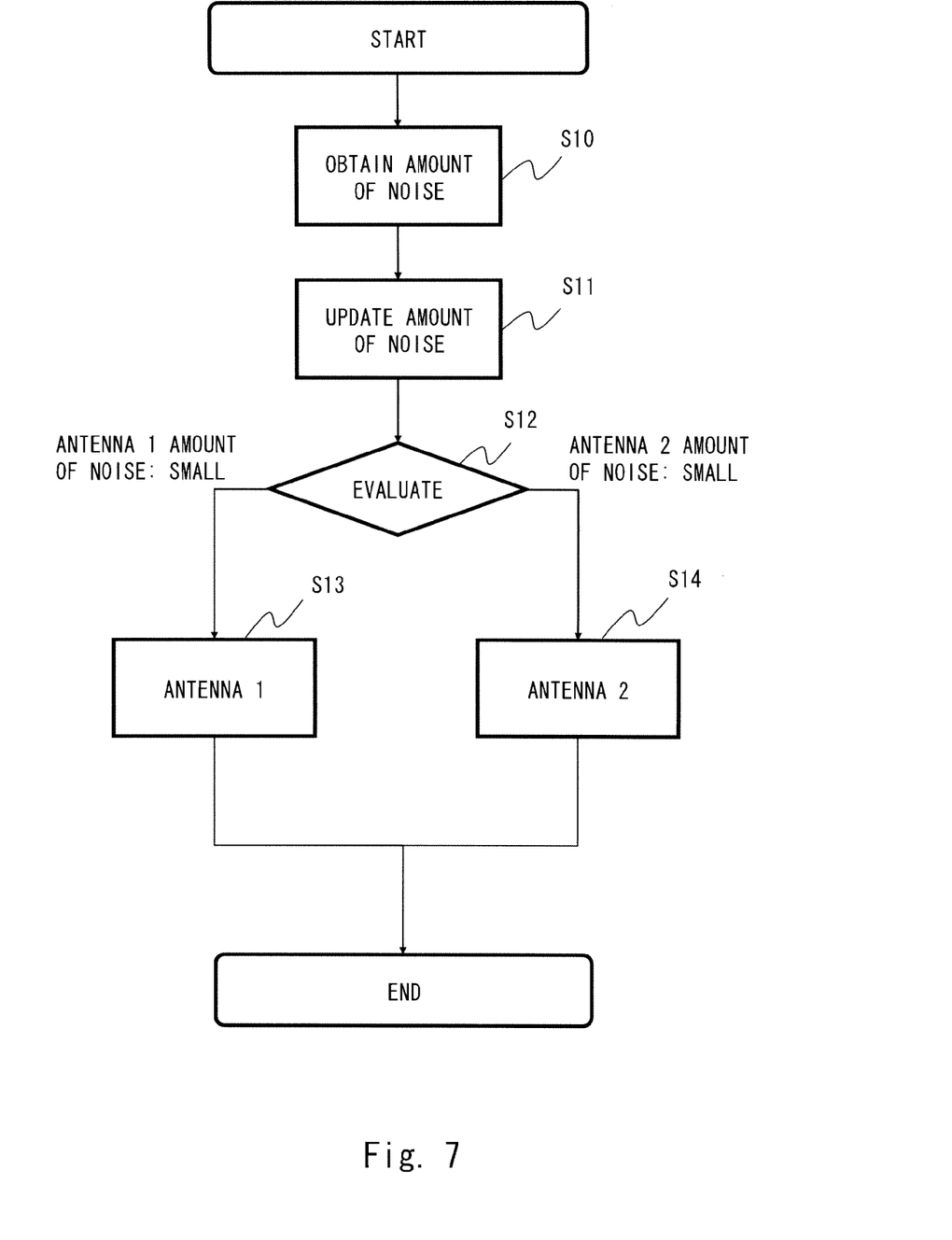
FIG. 7 is a flowchart of a time-division ratio measurement process according to the first exemplary embodiment.

Next, the process flow of the evaluation of the time-division ratio according to the second exemplary embodiment of the present invention is described with reference to FIG. 7. Firstly, the time-division ratio evaluation unit 9 obtains the amount of noise of the antenna 1 from the noise amount detection unit 8 (S10).

Next, the time-division ratio evaluation unit 9 saves the obtained amount of noise (S11). If the time-division ratio evaluation unit 9 already holds the amount of noise of the antenna 1, the obtained amount of noise may be overwritten, that is, only the latest amount of noise may be held. Alternatively, an averaging process may be performed to increase the weighting of the newly obtained amount of noise together with the already held amount of noise, and then the amount of noise is saved. In this example, the amount of noise of the antenna 2 shall already be held.

Next, the time-division ratio evaluation unit 9 compares the amount of noise of the antennas 1 and 2 (S12). The latest amount of noise of the antenna 1 and the latest amount of noise of the antenna 2 are compared here.

Next, if the time-division ratio evaluation unit 9 evaluates that the amount of noise of the antenna 1 is less than that of the antenna 2, the time-division ratio evaluation unit 9 determines to specify the selected period of the antenna 1 longer and the selected period of the antenna 2 shorter (S13). On the other hand, if the time-division ratio evaluation unit 9 determines that the amount of noise of the antenna 2 is less than that of the antenna 1, the time-division ratio evaluation unit 9 determines to specify the selected period of the antenna 2 longer and the selected period of the antenna 1 shorter (S14).

Figure 8:
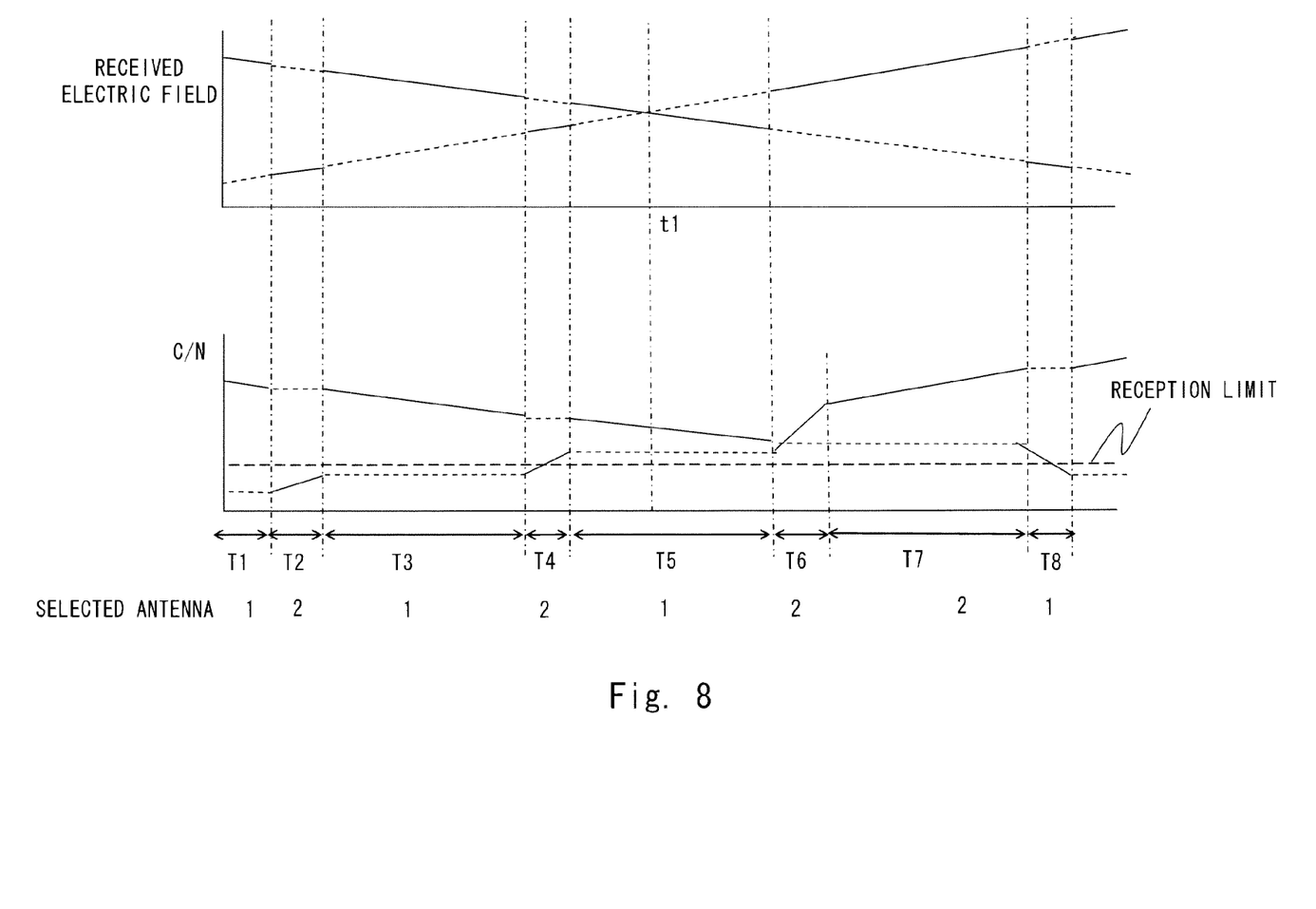
FIG. 8 illustrates timings of antenna switching according to the first exemplary embodiment.

Next, the switching timing of the antennas according to the first exemplary embodiment of the present invention is described with reference to FIG. 8. In the graph of FIG. 8, the vertical axis represents the received electric field, and the horizontal axis represents time. In FIG. 8, the solid line represents the received electric field of the selected antenna, and the dashed line represents the received electric field of non-selected antenna. The received electric field of the antenna 1 exceeds the received electric field of the antenna 2 by the time t1. The received electric field of the antenna 2 exceeds the received electric field of the antenna 2 after the time t1.

In the lower graph of FIG. 8, the vertical axis represents the C/N ratio that indicates the reception quality, and the horizontal axis represents time. The periods T1, T3, T5, and T8 indicate the selected period of the antenna 1, and the periods T2, T4, T6, and T7 indicate the selected period of the antenna 2. Further, the periods T1, T3, T5, and T7 indicate long selected periods, and the periods T2, T4, T6, and T8 indicate short selected periods.

Since the C/N ratio is the ratio of a signal to the amount of noise, the higher the C/N ratio, the better the reception quality. For example, in the period T3 in which the amount of noise of the antenna 1 is occasionally measured, as the amount of noise increases, the C/N ratio of the antenna 1 is gradually reduced. On the other hand, since the antenna 2 is not selected, the C/N ratio is calculated using the amount of noise of the antenna 2 which is measured and held in the period T2. Therefore, as for the antenna 2, the C/N ratio horizontally moves as there is no fluctuation in the amount of noise in the period 3. This also applies to the other periods.

From the periods T1 to T5, the C/N ratio of the antenna 1 exceeds the C/N ratio of the antenna 2, thus the time-division ratio evaluation unit 9 specifies the selected period of the antenna 1 longer. The C/N ratio of the antenna 2 exceeds the C/N ratio of the antenna 1 in the period T6. Therefore, the time-division ratio evaluation unit 9 specifies the selected period of the antenna 2 longer than that of the antenna 1. Thus, the time-division ratio evaluation unit 9 specifies to select the antenna 2 again in the period T7, which follows the period T6, and select the antenna 1 in the period T8, in which the selected period is shorter.

At this time, the time-division timing generation unit 10 may change the selected period so that the period T7 will be the short selected period and the period T8 will be the long selected period. In this case, the time-division ratio evaluation unit 9 selects the antenna 1 with reduced reception quality in the period T7, which is the short selected period, and selects the antenna 2 with improved reception quality in the period T8, which is the long selected period.

As explained above, the reception quality of the antennas 1 and 2 can be measured by the communication apparatus according to the first exemplary embodiment of the present invention. By specifying the selected period of the antenna with good reception quality to be longer, it is possible to improve the reception quality of the entire communication apparatus. Further, even if only one RF tuner is used, the reception quality of a plurality of antennas can be recognized. Furthermore, if the C/N ratio is favorable, the time-division process may not be performed and the selection of the antenna may be fixed. Particularly at the time of receiving data while moving, circumstances such as level, phase, and multipath change every moment, thus favorable characteristics can be maintained better if the time-division process is not performed in such a reception state.

Second Exemplary Embodiment

In the first exemplary embodiment, the mode of having two antennas is explained. Hereinafter, the mode of having three antennas is explained. As the configuration example of having three or more antennas is similar to the FIG. 1 except having three or more antennas, the drawing is omitted.

The antennas are switched by time-division also for the case of having three or more antennas. At this time, the control is performed to the periods to select each antenna so that the long selected period is specified for the antenna with good reception quality. In such a case, a long selected period may be specified to the antenna with the best reception quality and the same short selected periods may be specified to the other antennas. The selected period in this case will be two kinds, which are the long and the short selected periods. Alternatively, different selected periods may be specified according to the reception quality of each antenna. In such a case, the selected periods for the number of antennas are specified to each antenna. As for one antenna, it may be the one not connected at all times like an external earphone antenna. There is no large characteristic deterioration generated if the selected period of the antenna is short even in the state in which one antenna is not connected. Therefore, even when the connection state of the external antenna cannot be checked by another means, it is possible to assume that the antenna is connected and operate the antenna. Thus when the antenna is connected, the antennas can be smoothly switched. Moreover, in the case of using the antenna with unknown reception capability like an external antenna, the selected period of the antenna with higher capability can be made longer by the evaluation of the reception capability at all times, and thereby maintaining more stable reception state. If there is a difference in the reception capabilities of the antennas, it can be considered that the selected period of the antenna with higher capability is specified to be longer even with good receiving conditions. Thus in the fading environment that the electric field intensity is instantaneously reduced, more margin for the reduction in the electric field intensity is ensured, and this maintains the stable reception.

The present invention is not limited to the above exemplary embodiments, but may be modified as appropriate without departing from the scope of the present invention.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A communication apparatus comprising:
    a signal reception unit that receives a wireless signal by a plurality of antennas;
    a measurement unit that measures a reception quality of each of the plurality of antennas according to the wireless signal received by the signal reception unit;
    an antenna selection control unit that switches a selection of the plurality of antennas by time-division,
    wherein the antenna selection control unit periodically switches the plurality of antennas and also specifies the antenna with the best reception quality of the plurality of antennas to have a relatively longer selected period than others of the plurality of antennas according to the reception quality measured by the measurement unit; and
    a signal level control unit that controls a signal level of the wireless signal received by the signal reception unit from a first antenna to be substantially equivalent to the signal level of the wireless signal received by the signal reception unit from a different antenna, the first antenna and the different antenna being included in the plurality of antennas;
    wherein the signal level immediately before switching the first antenna to the different antenna is held and the signal level is controlled according to the held signal level immediately after switching from the different antenna to the first antenna.

2. The communication apparatus according to claim 1, further comprising a waveform equalization unit that performs a waveform equalization on a digital signal, the digital signal being digitally converted according to the wireless signal received by the signal reception unit,
    wherein the measurement unit measures the reception quality of the digital signal, which is processed with the waveform equalization by the waveform equalization unit.

3. The communication apparatus according to claim 2, wherein the waveform equalization unit performs the waveform equalization on the digital signal according to a pilot signal included in symbol data obtained from the antenna being the same antenna that received the corresponding wireless signal.

4. The communication apparatus according to claim 1, wherein the antenna selection control unit changes a selected period of the antenna according to a change in the reception quality measured by the measurement unit.

5. The communication apparatus according to claim 1, wherein the signal reception unit receives the wireless signal transmitted by orthogonal frequency division multiplexing.

6. The communication apparatus according to claim 5, wherein the antenna control unit switches the plurality of antennas at a timing so as to receive by the signal reception unit a first wireless signal symbol transmitted by orthogonal frequency division multiplexing.

7. A communication process method comprising:
    periodically switching a plurality of antennas by time-division and obtaining a reception quality of a received signal for each of the plurality of antennas, the received signal being received by the plurality of antennas;
    determining a selected period of the antenna so that the antenna with the best reception quality of the plurality of antennas will have a relatively longer selected period than others of the plurality of antennas according to the reception quality obtained for each of the plurality of antennas;
    controlling a signal level of the wireless signal received by the signal reception unit from a first antenna to be substantially equivalent to the signal level of the wireless signal received by the signal reception unit from a different antenna, the first antenna and the different antenna being included in the plurality of antennas;
    holding the signal level, the signal level being controlled immediately before switching the first antenna to the different antenna; and
    controlling the signal level according to the held signal level immediately after switching from the different antenna to the first antenna.

8. The communication process method according to claim 7, further comprising:
    performing a waveform equalization on the received signal received by the plurality of antennas; and
    obtaining the reception quality of each of the plurality of antennas according to the received signal, the received signal being processed with the waveform equalization.

* * * * *